United States Patent [19]
Takai et al.

[11] Patent Number: 4,723,184
[45] Date of Patent: Feb. 2, 1988

[54] POWER CAM DRIVING MECHANISM FOR A TAPE RECORDER

[75] Inventors: Kazuki Takai; Yukio Ito; Shigeo Kinoshita; Junichi Kikuchi; Toshihiko Fukazawa, all of Tokyo, Japan

[73] Assignee: Clarion Co., Ltd., Tokyo, Japan

[21] Appl. No.: 790,331

[22] Filed: Oct. 23, 1985

[30] Foreign Application Priority Data

Oct. 25, 1984 [JP] Japan .................. 59-222937
Oct. 25, 1984 [JP] Japan .................. 59-222938

[51] Int. Cl.<sup>4</sup> ............................................. G11B 15/32
[52] U.S. Cl. ................................ 360/96.3; 242/200
[58] Field of Search ............................ 360/96.3, 96.4; 242/197-202

[56] References Cited
U.S. PATENT DOCUMENTS
4,547,823 10/1985 Ri ................................ 360/96.3 X Primary Examiner—A. J. Heinz
Attorney, Agent, or Firm—Russell E. Hattis; Stephen R. Arnold

[57] ABSTRACT

A gear driving mechanism for driving a power cam, etc. for a tape recorder, in which a power cam driving working elements by its normal rotation is driven by a motor and the rotation direction of the motor is reversed for the purpose of loading, eject, etc. The mechanism is so constructed that a pivoting gear pivoting depending on the rotation direction of the motor is disposed at the motor side; a normal and a reverse rotation gear engaging with each other is disposed at the gear side; the pivoting gear at the motor side is engaged with one of the normal and the reverse rotation gear when the motor rotates in the normal direction, and with the other when it is pivoted by the reverse of the rotation of the motor.

9 Claims, 9 Drawing Figures

POWER CAM DRIVING MECHANISM FOR A TAPE RECORDER

FIELD OF THE INVENTION

This invention relates to a gear driving mechanism usable as a power cam driving mechanism for a tape recorder, etc. and more specifically to a gear driving mechanism, by which the power cam, two reel bases, etc. rotate always in the normal direction, independantly of the normal or reverse direction of the rotation of a motor for the loading or the ejection of a cassette, by bringing about simplifications to the construction of the gear and by disposing a means for detaching the reel bases from the motor so that the tape is never loosened at the moment of an eject operation.

BACKGROUND OF THE INVENTION

Recently, automation of the tape recorder has been advanced so that many tape recorders no force is needed for manual operation, and the change of various modes is effected only by extremely light operations, such as pushing switch buttons, by which the maintaining and the change of the modes are effected by utilizing the attractive force of electromagnetic plungers and the driving force of the motor.

In such widely automated tape recorders it is necessary to transfer working members to their predetermined positions by parallel displacement, and consequently to transform the rotating force of the motor to rectilinear motions. Usually a power cam is used as a transformation means for this purpose. This power cam is so constructed that it is rotated by the motor through a driving system consisting of a plurality of gears, which works and attracts a roller of a power plate only when the motor rotates in the normal direction, so that the power plate goes and returns and the members linked to the power plate effect parallel translation.

Moreover, this power plate is energized in the returning direction by a spring so that, when the power cam initially moves, it advances against the energizing force of this return spring, and when the power cam rotates further beyond the maximum cam diameter, it is returned by the energizing force of the return spring.

Consequently, the lead portion of the power cam has a long, slowly spirally varying curved surface, and as a result its return portion forms a short, rapidly varying curved surface so that the power cam can draw the power plate slowly, leaving always some surplus in available power, depending on the consturction of the power plate moving against the weight of all the elements and the force of the return spring.

Further, in an autoreverse type tape recorder, in which the tape moves both in the normal and in the reverse direction, the two reel bases, normal and reverse, for driving the tape in the normal and reverse directions are driven by a mechanism which is so constructed that the driving force of a motor rotating always only in the normal rotation direction is transmitted to two power gears, normal and reverse. These are engaged with each other so that they rotate always in directions opposite to each other, and the rotating force of these power gears is transmitted to either one of the reel bases, normal or reverse, by using a movable idler displaced according to the desired direction of movement of the tape.

In such a tape recorder, in order to satisfy the requirements of reduction of the size and system simplification, there is adopted a construction by which various sorts of working elements are moved by a driving system, which is in common to the driving system for the tape as stated above, and this latter driving system drives also, for example, the loading/eject mechanism.

Consequently, it is necessary to reverse the movement of the driving system for moving each of these, working elements in directions which are opposite to each other for loading and for ejection. For this purpose, heretofore, a commuting mechanism has been disposed in the train of the driving system. However, since the mechanism is complicated by this structure, recently a construction has been used wherein the necessity for a commuting mechanism is eliminated by use of a motor rotatable in both directions, i.e., normal and reverse.

Furthermore, in the tape recorder described above, the eject operation is effected preferably relatively slowly by the driving force of the motor, since the tape is easily charged with static electricity; hence, if the tape is loose, it is attracted by the journal of the capstan, the pack guide, etc. to be deviated from its normal path, which gives rise to the inconvenience that the tape is twisted, or folds are produced therein.

In order to solve these problems provoked by the looseness of the tape, heretofore there has been adopted a method by which before the eject operation the driving gear is engaged with both the reel bases, normal and reverse, so that both reel bases are rotated in the direction in which the tape is wound.

In a tape recorder which is so widely automated, for moving each of the working elements in the directions opposite to each other for loading and for eject, it is necessary to reverse the movement of the driving system. For this puspose, heretofore, a commuting mechanism has been disposed in the train of the driving system. However, since the mechanism is complicated by this structure, recently there has been adopted a construction by which the commuting mechanism can be omitted by using of a motor rotatable in both the directions, normal and reverse.

In addition, when the driving system is reversed in the reel base driving mechanism of the autoreverse type tape recorder described above, it has the following disadvantages.

That is, in order to reverse the driving system, there is adopted usually a construction in which the reel bases are isolated from the driving system by detaching the idler from the reel bases. However, in this case, since this detaching of the driving system from the reel bases is liable to be done imperfectly or with a delay, the rotation direction of the reel bases is reversed. On the other hand the normal rotation direction is the one by which the tape is wound by each of the reel bases. Consequently, when the rotation direction of each of the reel bases is reversed, since the reel bases rotate in the direction by which the tape is rewound, the tape is unwound, loosened, twisted or entangled on the way, which was a problem to be solved.

Furthermore, prior art tape recorders in which both the reel bases are rotated in the direction in which the tape is wound, have the following disadvantages.

In the method wherein looseness of the tape is removed by rotating the reel bases, since the reel bases continue to rotate as the motor rotates, during ejection the cassette is raised while a force is applied to the tape by rotating the reel bases. Consequently, when the cassette leaves the reel bases, it leaves one of them earlier than the other. Consequently a force of the other reel base is applied thereto, or the tape is liable to be loosened by the inertia of the tape produced by the rotational force of the reel bases due to the rapid removal of the force appied to the tape. As mentioned above, in spite of the means provided for preventing the looseness of the tape, the tape is evenutally loosened, and as a result the tape, deviated from its normal path, is twisted, or folded, which was another problem to be solved.

In addition, recently, some driving systems are so constructed to be reversed, depending on the operation to be effected by means of a motor rotatable in two directions, normal and reverse. In this kind of tape recorder, if the rotation of the reel bases is reversed, as it was, at the moment of the reverse of the rotation of the motor, the tape is unwound. As the result, since the tape is loosened, in addition to the problems stated above, there is another problem regarding how the reel bases can be constructed so as not to be reversed.

OBJECT OF THE INVENTION

This invention has been proposed in order to remove the disadvantages of the prior art techniques stated above, and its object is to provide a power cam driving mechanism for the tape recorder in which the lock of the power cam is released by realizing a construction by which the power cam is not reversed when the driving system is reversed for the purpose loading, ejecting, etc.

Another object of this invention is to provide a reel base driving mechanism for a tape recorder, for which the tape is not unwound, loosened, twisted, entangled, etc. on the way by realizing a construction wherein the reel bases are not reversed when the driving system is reversed for the purpose of loading, ejecting, etc.

Still another object of this invention is to provide an eject mechanism for a tape recorder in which the tape is never twisted or folded as the result of deviation of the tape from its normal path by constructing the mechanism so that the tape is not loosened after having once removed the looseness of the tape by rotating the reel bases.

SUMMARY OF THE INVENTION

In order to achieve these objects, there is provided a gear driving mechanism for a tape recorder comprising:

a motor rotatable in two directions, normal and reverse;

a power gear driven by said motor;

a power idler gear engaged with said power gear;

a pivoting gear pivoted by said power idler gear, depending on its rotation direction; and a normal and a reverse rotation gear, which are engaged with each other, whereby said pivoting gear is pivoted so that it is engaged with the normal or the reverse rotation gear, depending on the rotation direction of the power idler gear.

BRIEF DESCRIPTION OF THE DRAWINGS

FIGS. 5 to 7 are plan views illustrating still another embodiment of the eject mechanism according to this invention; FIG. 5 indicating the detached reel bases on the way of the retreat of the head plate; FIG. 6 the manner whereby tape looseness is removed during the termination of the retreat of the head plate; and FIG. 7 the detached reel bases at the reverse rotation of the motor;

DETAILED DESCRIPTION

An example of power cam driving mechanisms as an embodiment of the gear driving mechanism of a tape recorder according to this invention will be explained hereinbelow more concretely, referring to the drawings.

Figure 1:
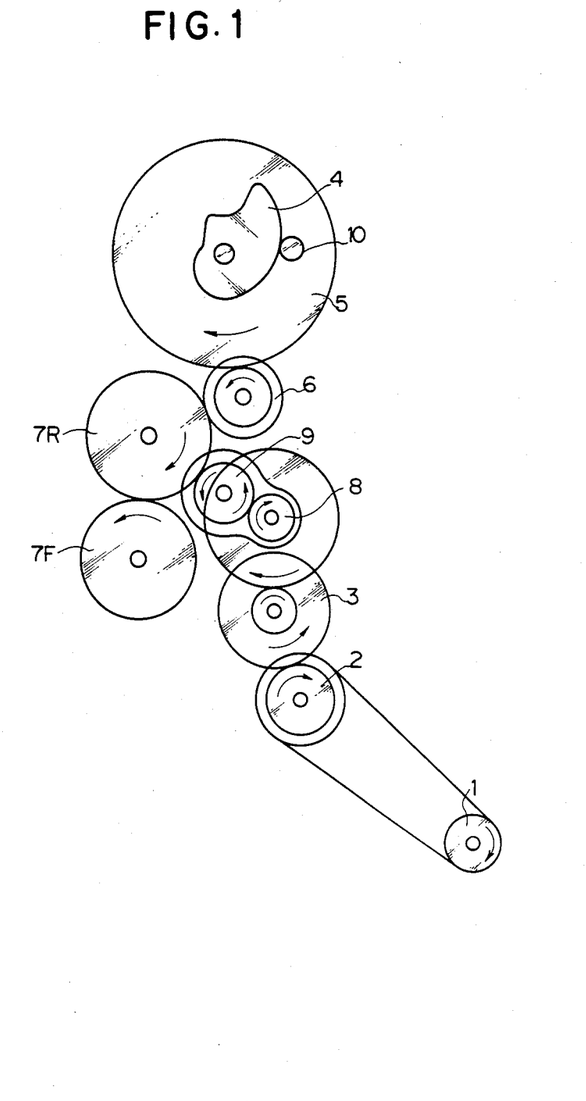
FIGS. 1 and 2 are plan views illustrating an embodiment of the power cam driving mechanism according to this invention, FIG. 1 indicating the mechanism for the normal rotation direction of the motor and FIG. 2 the same for the reverse rotation direction of the motor.
Figure 2:
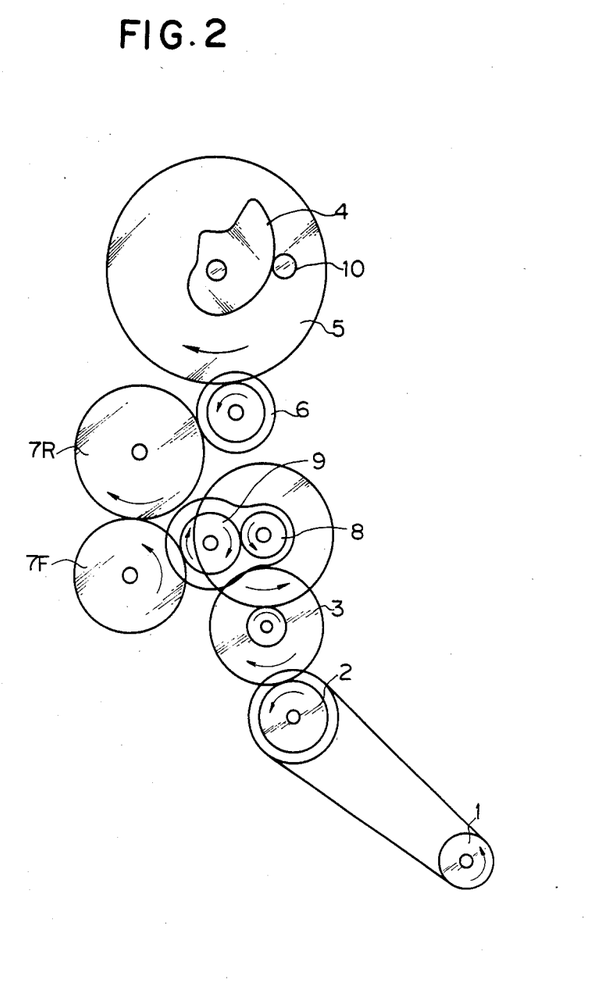

As indicated in FIGS. 1 and 2, a power gear 3 is engaged with a pulley gear 2 linked to a motor 1. A cam gear 5 provided with a power cam 4 is disposed at the side opposite to this motor 1, with which cam gear 5 a small gear 6 is engaged. The power cam 4 is so formed that it has a long, slowly varying spiral-shaped curved surface, working while rotating clockwise and a rapidly varying curved surface continuing from the maximum diameter portion to the minimum diameter portion.

Further, a normal and a reverse gear 7F and 7R are disposed at the motor side and at the cam side, respectively, driving the normal and the reverse reel base between the power gear 3 and the small gear 6. The two gears 7F, 7R engage always with each other and the gear 7R of the reverse direction side is engaged with the small gear 6.

In addition, an power idler gear 8 pivoting a pivoting gear, depending on the rotation direction between the power gear 3 and the normal and the reverse gear 7F, 7R, which power idler gear 8 is engaged with the power gear 3. Further, the pivoting gear 9 pivots, depending on the rotation direction of this power idler gear 8. Thus, when the power idler gear 8 rotates clockwise in the figure, it pivots in the same direction and is engaged with the gear 7R of the reverse rotation side; and when the power idler gear 8 rotates counterclockwise, it pivots in the same direction and is engaged with the gear 7F of the normal rotation side.

Further, the power cam 4 pulls the power plate so that a latter goes and returns by making work a roller 10 of the power plate, not indicated in the figure.

On the basis of the construction as described above, the power cam driving mechanism works as follows.

When the motor 1 rotates in the normal direction, i.e. when the motor 1 rotates clockwise, the pulley gear 2 linked to the motor 1 rotates clockwise and the power gear 3 engaged with the pulley gear 2 rotates counterclockwise, as indicated in FIG. 1. Consequently, the power idler gear 8 engaged with the power gear 3 rotates clockwise. In this way the pivoting gear 9 mounted on the power idler gear 8 pivots clockwise and is engaged with the gear 7R of the reverse rotation side. At this moment, since the pivoting gear 9 rotates counterclockwise, the gear 7R of the reverse rotation side rotates clockwise and the gear 7F of the normal rotation side engaged with the gear 7R rotates counterclockwise. Consequently, the cam gear 5 engaged with the gear 7R of the reverse rotation side through the small gear 6 rotates clockwise, i.e. in the working direction of the power cam 4.

When, starting from this state, the rotation of the motor 1 is reversed for the purpose of loading, eject, etc., the pulley gear 2 rotates counterclockwise and the power gear 3 does clockwise, as indicated in FIG. 2. As the result, at the same time as the reverse of the rotation of the power gear 3, the power idler gear 8 engaged with this power gear 3 rotates counterclockwise. Consequently, the pivoting gear 9 pivots counterclockwise and is engaged with the gear of the normal direction. At this moment, since the pivoting gear 9 rotates clockwise, the gear 7F of the normal rotation side rotates counterclockwise and the gear 7R does clockwise. Therefore, the cam gear 5 rotates clockwise, i.e. in the working direction of the power cam, through the small gear 6, just as before the reverse of the rotation of the motor 1.

As explained above, in this embodiment the rotation direction of the cam gear 5 rests unchanged before and after the reverse of the rotation of the driving system, and it rotates always in the working direction of the power cam 4. Consequently, there is no danger that the power cam 4 will be locked by the roller of the power plate, even in the case where the power source is again switched on after the power source has been switched off at the moment of the reverse of the motor 1 and the power cam 4 has been engaged with the driving system, in the prior art techniques.

Figure 3:
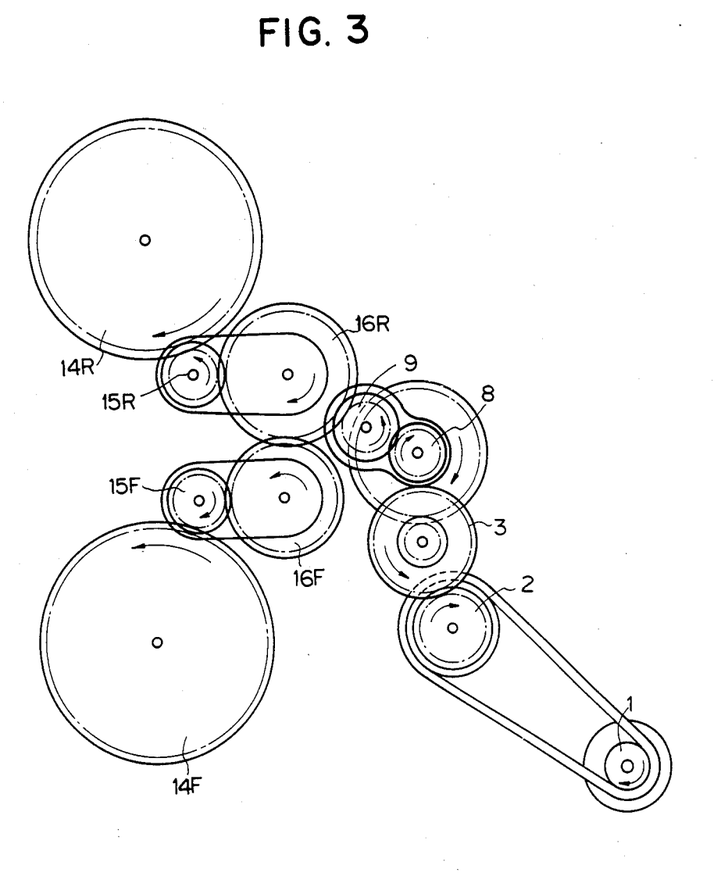
FIGS. 3 and 4 are plan views illustrating another embodiment of the reel base driving mechanism according to this invention, FIG. 3 indicating the mechanism for the normal rotation direction of the motor and FIG. 4 the same for the reverse rotation direction of the motor.
Figure 4:
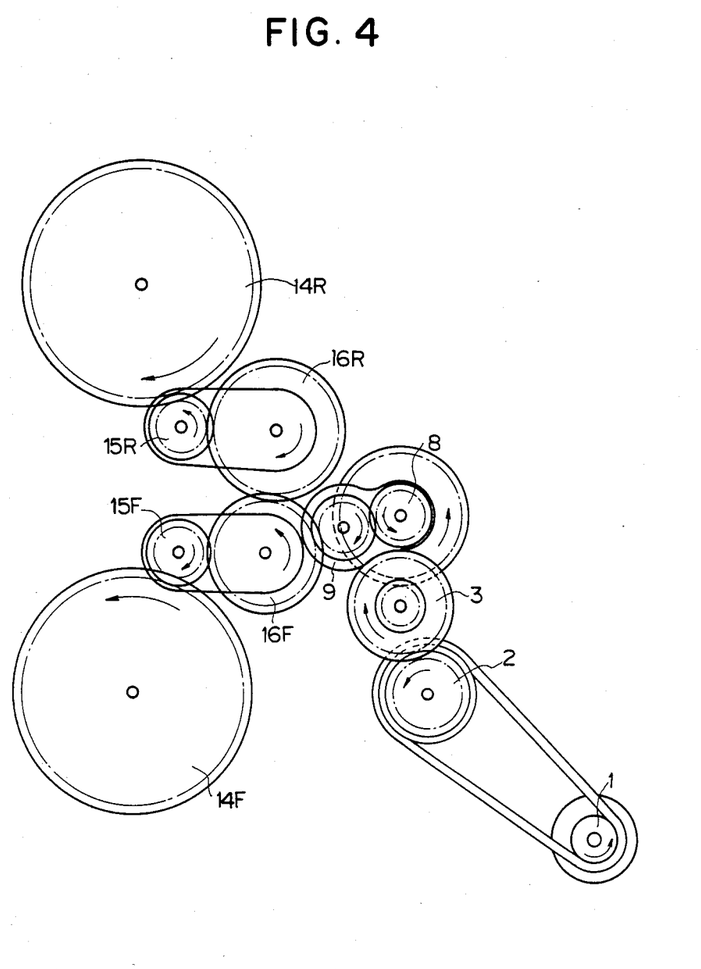

FIGS. 3 and 4 show an embodiment by which this invention is applied to the reel base driving mechanism for a tape recorder. A power gear 3 at the motor side is engaged with a pulley gear 2 liked to a motor 1. A normal and a reverse reel base 14F, 14R are disposed at the side opposite to the motor 1 and they are engaged with idler gears 15F, 15R having a small diameter, respectively.

These idler gears 15F, 15R are engaged with a normal and reverse power gear 16F, 16R having a larger diameter, respectively, and at the same time the normal and the reverse power gear 16F, 16R engage with each other.

Further, a power idler gear 8 pivoting a pivoting gear 9, depending on the rotation direction is disposed between the power gear 3 at the motor side and the normal and the reverse power gear 16F, 16R, which idler gear is engaged with the power gear 3 at the motor side. In addition, the pivoting gear 9 pivots, depending on the rotation direction of this power idler gear 8. That is, when the power idler gear 8 rotates clockwise in the figure, the pivoting gear 8 pivots in the same direction and is engaged with the power gear 16R of the reverse rotation side. To the contrary, when the power idler gear 8 rotates counterclockwise in the figure, it pivots in the same direction and is engaged with the power gear 16F of the normal rotation side.

On the basis of the construction as described above, the reel base driving mechanism works as follows.

When the motor rotates in the normal direction, i.e. when the motor 1 rotates clockwise, the pulley gear 2 linked to the motor 1 rotates clockwise, and the power gear 3 at the motor side engaged with the pulley gear 2 rotates counterclockwise, as indicated in FIG. 3. As the result, the power idler gear 8 engaged with this power gear 3 at the motor side rotates clockwise. Consequently, the pivoting gear 7 mounted on the power idler gear 8 pivots clockwise and is engaged with the power gear 16R of the reverse rotation side. At this moment, since the pivoting gear 7 rotates counterclockwise, the power gear 16R of the reverse rotation side rotates clockwise and the power gear 16F engaged with the same power gear 16R rotates counterclockwise. Therefore, the normal and the reverse reel bases 14F, 14R engaged with the power gears 16F, 16R through the idler gears 15F, 15R, respectively, rotate in the same direction as the power gears 16F, 16R of each side. That is, the reel base 16F of the normal rotation side rotates counterclockwise and the reel base 16R of the reverse rotation side does clockwise. Therefore, both the reel bases 16F, 16R rotate in the direction in which the tape is wound.

When, starting from this state, the rotation of the motor 1 is reversed for the purpose of loading, eject, etc., the pulley gear 2 rotates counterclockwise and the power gear 3 at the motor side goes clockwise. As the result, at the same time as the reverse of the rotation of the power gear 3 at the motor side, the power idler gear 8 engaged with this power gear 3 rotates counterclockwise. Consequently, the pivoting gear 9 pivots counterclockwise and is engaged with the power gear 16F of the normal direction. At this moment, since the pivoting gear 9 rotates clockwise, the power gear 16F of the normal rotation side rotates counterclockwise and the power gear 16R does clockwise. Therefore, the reel bases 14F and 14R rotate clockwise and counterclockwise through the idler gears 15F and 15R, respectively, i.e. in the direction in which the tape is wound.

As explained above, according to this embodiment, the rotation direction of the power gears 16F, 16R, normal and reverse, driving the reel bases 14F, 14R, normal and reverse, rests unchanged before and after the reverse of the rotation of the driving system, and the reel bases 14F, 14R will rotate always in the direction in which the tape is wound. Consequently, there is no danger that the rotation of the reel bases will be reversed so that the tape is unwound, loosened, twisted, entangled, etc., even in the case where the power source is switched off during the movement of the reel bases, as by the prior art techniques.

This invention is not limited to the embodiment indicated in the figures, and the pivoting region for the pivoting gear may be limited by disposing stoppers so that the pivoting gear is not engaged with the opposite power gear, but the rotating force in the reverse direction is not transmitted to the power gear, with which it has been engaged up to that time.

Figure 5:
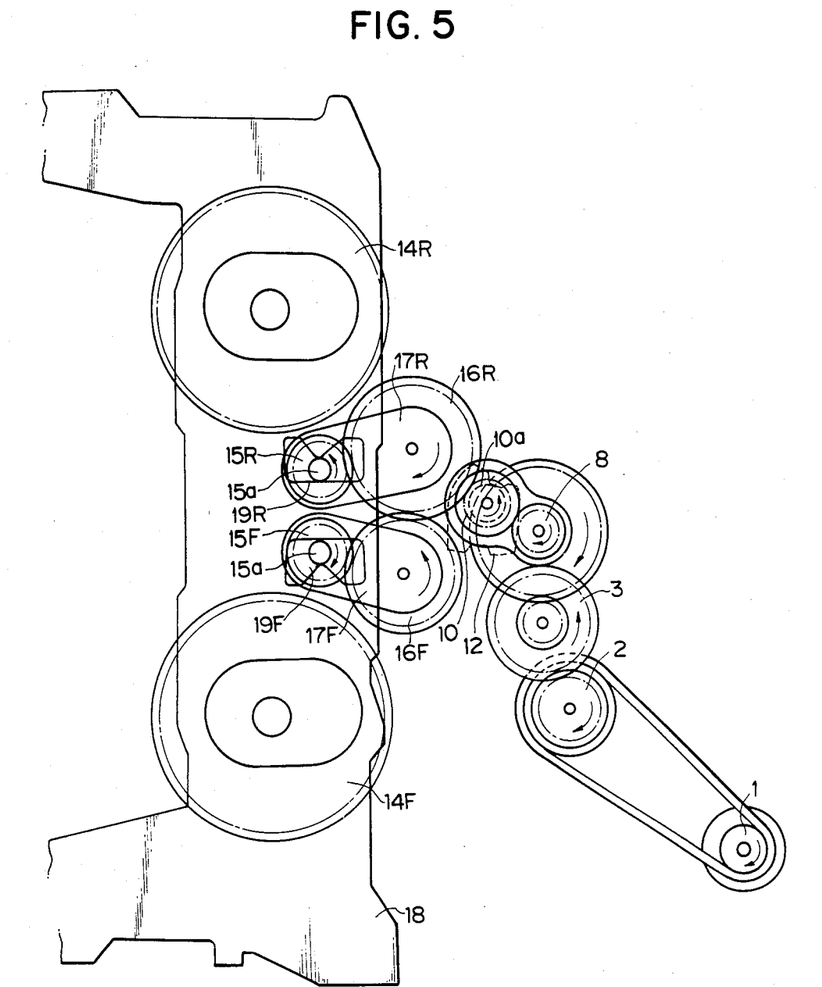
Figure 6:
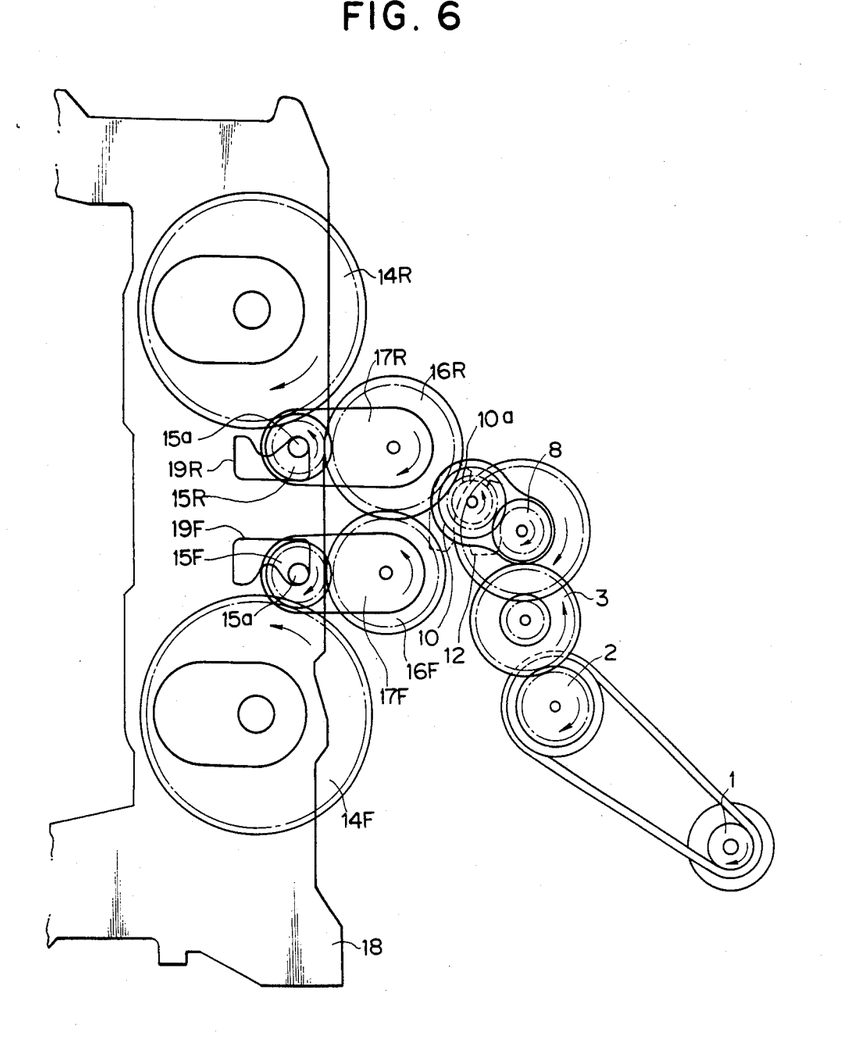
Figure 7:
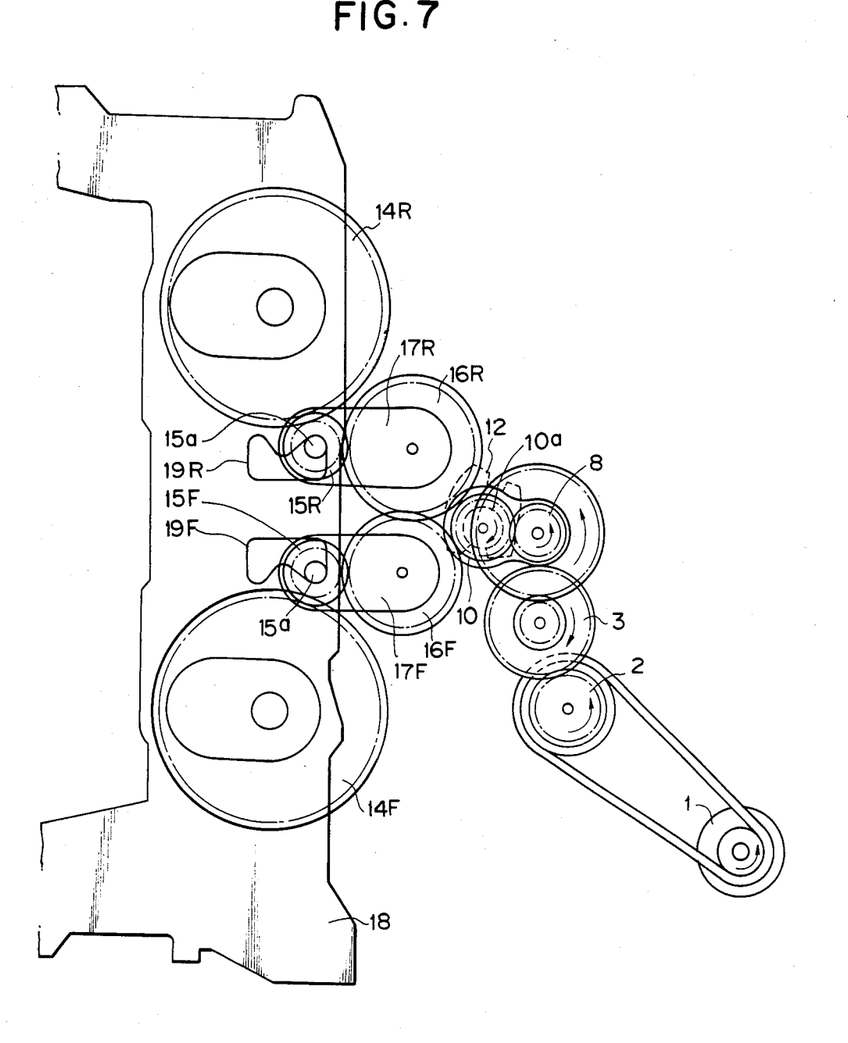

FIGS. 5 to 7 show an embodiment, in which this invention is applied to the eject mechanism for a tape recorder. A power gear 3 is engaged with a pulley gear 2 linked to a motor 1. On the other hand, a normal and a reverse reel base 14F, 14R, which rotate counterclockwise and clockwise in the figure in their normal directions (direction in which the tape is wound), respectively, are driven by a normal and a reverse power gear 16F, 16R linked to a power gear 3 at the motor side through their idler gears 15F and 15R, respectively, disposed between the reel bases.

The normal and the reverse power gear 16F, 16R are engaged with each other, and on these power gears 16F, 16R are mounted rotatably and coaxially a normal and a reverse link arm 17F and 17R. A journal 15a of the normal and reverse idler gear 15F, 15R is disposed at one end of each of the link arms 17F, 17R.

Further, a normal and a reverse guide hole 19F, 19R opposite to each other are formed on a head plate 18 at the positions corresponding to the idler gears 15F, 15R, respectively, and in these guide holes 19F, 19R are inserted the journals 15R of the idler gears 15F, 15R, respectively. These guide holes 19F, 19R are elongated in the direction of the movement of the head plate 18, respectively. For each of the guide holes, at both the extremities are formed enlarged portions and on the outer edge in the middle part is formed a projection protruding inward for the separation. Thus, when the head plate 18 is at its advanced position, the journal 15a of each of the idler gears 15F, 15R is at one of the enlarged portions so that the same gears 15F, 15R are engaged with the reel bases 14F, 14R. To the contrary, when the head plate 18 moves from its advanced position to its retreated one, the journal 15a of each of the idler gears 15F, 15R is located on its corresponding so that each gear 15F, 15R is displaced toward the middle part of the head plate 18, and as a result these same gears 15F, 15R are disengaged from the reel bases 14F, 14R, respectively.

In addition, a power idler gear 8 pivoting a pivoting gear 10, depending on the direction of rotation, are disposed between the power gear 3 at the motor side and the normal and the reverse power gear 16F, 16R. In this way, the pivoting gear 10 is pivoted depending on the direction of rotation of this idler gear 8. Further, a position regulation portion 10a is formed coaxially to this journal, which portion is inserted in a position regulation hole 12 disposed in the base. Thus, when the power idler gear 8 rotates clockwise in the figure, it pivots in the same direction and is engaged with the power gear 16R of the reverse side. To the contrary, when the power idler gear 8 rotates counterclockwsie in the digure, it pivots in the same direction, but it is stopped by being regulated by the position regulation hole 12, before it is engaged with the power gear 16F of the normal side.

In addition, when loading is commanded, the motor 1 rotates in the normal direction (clockwise in the figure). When eject is commanded, it rotates in the normal direction until the termination of the retreat of the head plate 18 and just after that it rotates in the reverse direction (counterclockwise in the figure). Further, the motor 1 is so constructed that during the loading or eject operation it drives a driving element not indicated in the figure, through which it makes other elements holding the cassette at its play position, such as a pack guide and others, effect the loading or eject operation.

On the basis of the construction as described above, the eject mechanism of this embodiment works as follows.

At first, when the head plate 18 and the other working elements are at their working position, since the journal of the idler gears 15F, 15R is in the back side enlarged portion of the guide holes 19F, 19R, respectively, the idler gears 15F, 15R are free, and either one of the gears 14F, 14R, depending on the movement direction, is selectively engaged with one of the reel bases 15F, 15R by a switching means (program changing mechanism).

In this state, when an eject is commanded, at first the head plate moves toward its retreated position. Then, at the moment when the head plate is retreated to a predetermined position, the journals 15a of the idler gears 15F, 15R are raised on the projection of the guide holes 19F, 19R, as indicated in FIG. 1. Consequently, the same gears 15F, 15R are displaced toward the middle part and as the result, whichever one of the idler gears 15F, 15R, engaged with the reel bases 14F, 14R is detached therefrom. Therefore, the idler gears 15F, 15R of both the sides are detached at once from the reel bases 15F, 15R.

Further, when the head plate 18 reaches its retreated position, since the journals 15a of the idler gears 15F, 15R come to the front side enlarged portion of the guide holes 19F, 19R, as indicated in FIG. 6, the idler gears 15F, 15R become again free so that they can engage with the reel bases, respectively.

Then, until the termination of the retreat of the head plate 18, since the motor rotates in the normal direction, the pulley gear 2 linked with the motor 1 rotates clockwise and the power gear 3 of the motor side engaged with the pulley gear 2 rotates counterclockwise. Consequently, the power idler gear 8 engaged with the power gear 3 rotates clockwise. By this fact the pivoting gear 10 mounted on the power idler gear 8 pivots clockwise and is engaged with the power gear 16R of the reverse side. At this moment, since the pivoting gear 10 rotates counterclockwise, the power gear 16R of the reverse side rotates clockwise, and the opposite power gear 16F engaged by the same gear 16R rotates counterclockwise. Consequently, the idler gears 15F, 15R enlarged with the power gears 16F, 16R of both the sides rotate clockwise and counterclockwise, respectively.

On the other hand, the link arms 17F, 17R mounted coaxially to the power gears 16F, 16R rotate clockwise and counterclockwise, similarly to the power gears 16F, 16R, respectively, because the journal 15a mounted at an extremity of each of the idler gears 15F, 15R is free. By this fact, the idler gears 15F, 15R are engaged with the reel bases 14F, 14R, and the reel bases 14F, 14R rotates clockwise and counterclockwise, respectively. In this case, since both the reel bases 14F, 14R rotate in the normal direction in which the tape is wound, looseness of the tape is removed.

In this way, after the termination of the retreat of the head plate 18, the motor 1 rotates in the normal direction for a while and begins to rotate in the reverse direction just after having once stopped. As the result, the driving elements not indicated in the figure are driven and various elements holding the cassette at its play position, which are not indicated in the figure, through these driving elements, begin the eject operation.

In addition, when the motor 1 rotates in the reverse direction, the pulley gear 2 rotates counter clockwise, the power gear 3 of the motor side clockwise, and the power idler gear 8 counterclockwise. Thus the pivoting gear 10 is detached from the the power gear 16R of the reverse side and pivots clockwise. In this case, since the position regulation portion 10a disposed on the pivoting gear 10 is regulated by the position regulation portion 12, the pivoting gear 10 stops before it is engaged with the power gear 16F of the normal side, as indicated in FIG. 7, and it rotates clockwise at that position. That is, when the motor 1 rotates in the reverse direction, both the normal and the reverse power gear 16F, 16R are separated completely from the motor 1.

Consequently, the normal and the reverse reel base 14F, 14R can stop without any surplus force after having rotated a little by inertia by the fact that the motor stops once, and since they do not rotate again, even if the motor rotates in the reverse direction, any unreasonably great force is not applied to the tape by the reel bases 14F, 14R, in the case where the cassette is taken out to the eject position by the movement of the elements. That is, the cassette is not raised while applying winding force to the tape, as in the prior art tachniques, and therefore since force, which has been applied to the tape, is not suddenly removed by the fact that the cassette is detached from the reel bases, the tape is never loosened at this moment. Consequently, there is no danger that a loosened tape adheres to the journal of the capstan, the pack guide, etc., a result of which it would be deviated from its normal path and twisted or folded.

Furthermore, although the idler gear is pivoted by the rotating force of the motor so that it is engaged with the reel base, this invention is not at all limited to this form of realization. For example, it is conceivable to energize the idler gear toward the reel base side by means of a spring. Further, concerning the means for decoupling the reel base, it is not limited to the pivoting gear, but other measures for disengagement of gears by another element working at the moment of an eject operation, etc. may be possible.

Figure 8:
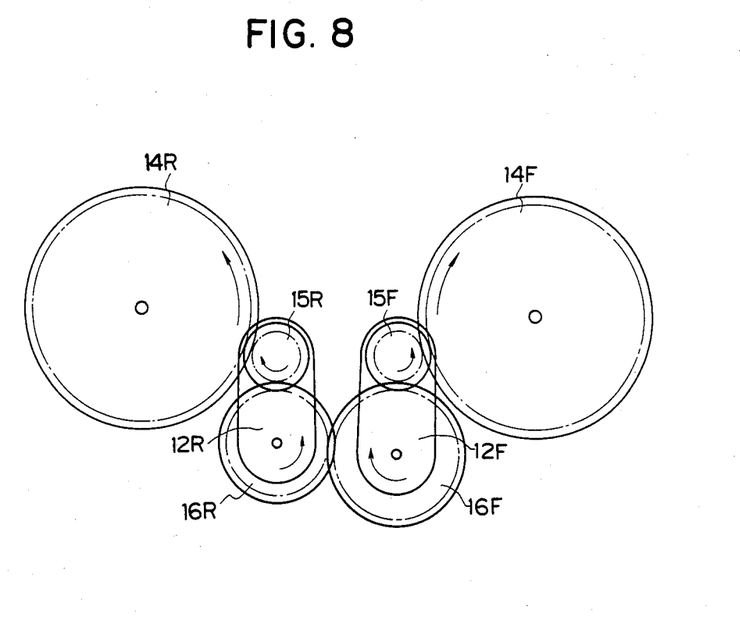
FIGS. 8 and 9 are a plan view and a cross-sectional view, respectively, indicating still another embodiment of the idler driving mechanism according to this invention.
Figure 9:
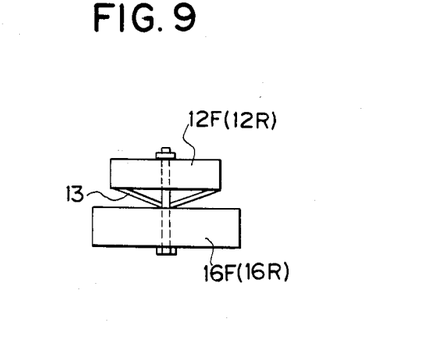

FIG. 8 shows another idler driving mechansim for a tape recorder, which is a modification of the embodiment indicated in FIG. 3. two power gears 16F, 16R, normal and reverse, linked with the motor are engaged with each other and rotate clockwise and counterclockwise in the normal direction. An extremity of arms 12F, 12R is mounted on the journal of these power gears 16F, 16R, respectively, and the arms 12F, 12R are so constructed that they pivot depending on the rotation direction of the power gears 16F, 16R. That is, they pivot outward, when the gears 16F, 16R rotate in the normal direction and inward, when the gears 16F, 16R rotate in the reverse direction. A small spring 13 as indicated in FIG. 9 between the power gears 16F, 16R and the arms 12F 12R, to which spring thrust force is given. Further, the normal and the reverse arms for the tape are regulated toward the separation side by a channel change mechanism not indicated in the figure. On the other hand, normal and reverse idler gears 15F, 15R are mounted on the other extremity of the arm 12f, 12R, and pressed toward or separated from the normal and the reverse reel bases 14F, 14R disposed at the outside of the arms 12F, 12R, according to their pivot direction.

On the basis of the construction as described above, the working mode of this embodiment will be explained as follows.

At first, when the motor rotates in the normal direction and the power gears 16F, 16R rotate in the normal direction, the arms 12F, 12R pivot outward, responding to these movements. At this moment, if forward movement is commanded, the arm 12F of the normal side, which is the forward movement side, pivots without any regulation and the idler gear 15F mounted on an extremity if pressed toward the normal reel base 14F so that the reel base 14F rotates clockwise, i.e. in the normal direction.

At this moment, since pressing force of the idler gear 15F is obtained by thrust force of the small spring 13 disposed between the gears 16F, 16R and the arms 12F, 12R, the problem of the spatial restriction due to the construction in which a pressing spring is hooked on the idler gear, as in the prior art techniques, is eliminated.

Starting from this state, when the rotation of the motor is reversed for the purpose of an eject operation, the power gears 16F, 16R are reversed and rotated counterclockwise and clockwise, respectively. By this fact, the arms 12F, 12R pivot inward; the idler gear 15F of the forward movement side is separated from the reel base 14F; and the reel base 14F stops to rotate.

As explained above, according to this embodiment, when the driving system is reversed, since the idler gears 15F, 15R are detached from the reel bases 14F, 14R, there is no danger that the normal and the reverse reel bases 14F, 14R will be reversed the tape is unwound, loosened, twisted or entangled.

Furthermore, this invention is not limited to the embodiment indicated in the figure at all, but it is conceivable to adopt, instead of a small spring, adhesive substance such as grease as the thrust force giving means disposed between the power gears and the arms. In addition, the thrust force may be disposed between the idler gears and the arms.

As explained above, according to this invention, by constructing the power cam driving mechanism so that the combination of gears in the train of the driving system, using pivoting gears, it is possible that the rotation direction of the power cam rests unchanged before and after the reverse of the movement of the driving system, and thus a high performance power cam driving mechanism for a tape recorder not having the disadvantage that the power cam is locked can be obtained.

Further, according to the embodiment indicated in FIGS. 3 and 4, by constructing the mechanism so that the reversal of the driving system is detected immediately by means of pivoting gears so that they are separated from the power gear, with which they have been engaged up to that time, it is possible to provide an advantageous reel base driving mechanism for a tape recorder, in which there is no danger that at the moment of the reverse of the direction of the driving system the tape will be unwound, loosened, twisted, entangled, etc.

Furthermore, according to the embodiment indicated in FIGS. 5 to 7, since there is no danger that by an eject operation looseness is agains provoked after having once eliminated looseness of the tape, owing to means disposed for separating the reel base from the gear of the motor side, it is possible to provide an improved eject mechanism for a tape recorder having no danger that the tape will be deviated from its normal path and thus twisted or folded at the moment of taking out the cassette.

Still further, according to the embodiment indicated in FIGS. 8 and 9, since the problem concerning the spatial restriction is solved and the reel base is not reversed at the moment of the reverse of the movement of the driving system, owing to the use of means of simple construction disposed for connecting and disconnecting the idlers, it is possible to provide an excellent idler driving mechanism for a tape recorder having no danger that the tape will be unwound on the track, loosened, twisted, entangled.

The embodiments of the invention in which an exclusive property or privilege is claimed are defined as follows:

1. A gear driving mechanism for a tape recorder having a motor rotatable in forward and reverse directions, said mechanism comprising:
   a power idler gear to be coupled to said motor to be bi-directionally driven according to the direction of rotation of said motor;
   gear means having a plurality of gears including forward and reverse rotation gears for driving forward and reverse reel bases respectively and coupling means for simultaneously driving said rotation gears in given directions;

a pivoting gear; and movable mounting means for mounting said pivoting gear to satellite around said power idler gear between first and second drive positions according to the direction of rotation of said power idler gear while remaining in driven engagement therewith, said gear means being disposed so that with said pivoting gear disposed in said first position one of said plurality of gears is engaged thereby, and with said pivoting gear disposed in said second position another of said plurality of gears is engaged thereby, and so that said forward and reverse rotation gears will be driven without reversal either when said pivoting gear is in said first position and driven by said motor in a given rotating direction, or when in said second position and driven in the opposite rotating direction.

2. The gear driving mechanism of claim 1 wherein said forward and reverse rotation gears are disposed to be in direct engagement with each other to be driven in opposite directions, and said pivoting gear drivingly engages one of said forward and reverse rotation gears when in said first drive position thereof and the other when in said second drive position.

3. The gear driving mechanism of claim 2 further comprising a cam gear having a power cam mounted thereon and disposed to be engagingly driven by one of said forward and said reverse rotation gears.

4. The gear driving mechanism of claim 1 wherein said gear means includes a forward and a reverse power gear directly engaged to each other, a forward idler gear pivotally mounted to satellite about said forward power gear to engagingly supply drive from said forward power gear to said forward rotation gear when said forward power gear is driven in a given direction, a reverse idler gear pivotally mounted to satellite about said reverse power gear to engagingly supply drive from said reverse power gear to said reverse rotation gear when said reverse power gear is driven in a direction opposite to that of said forward power gear, and wherein said gear means is configured so that said pivoting gear drivingly engages one of said forward and reverse power gears when in said first drive position thereof and the other when in said second drive position.

5. The gear driving mechanism of claim 4 further including a head plate movable between advanced and retreated positions and having a pair of guide holes for engagingly displacing the journals of said forward and reverse idler gears according to the position of said head plate, said guide holes being configured to urge said forward and reverse idler gears to disengage from said forward and reverse rotation gears respectively when said head plate is at said retreated position.

6. The gear driving mechanism of claim 4 further comprising a cam gear having a power cam mounted thereon and disposed to be engagingly driven by one of said forward and said reverse rotation gears.

7. The gear driving mechanism of claim 1 further comprising a cam gear having a power cam mounted thereon and disposed to be engagingly driven by one of said forward and said reverse rotation gears.

8. A gear driving mechanism for a tape recorder comprising:

forward and reverse rotating gears for driving forward and reverse reel bases respectively;

a forward and a reverse power gear mounted for direct engagement with each other;

forward and reverse link arms mounted for rotation about said forward and reverse power gears respectively;

a forward and reverse idler gear pivotally mounted on said forward and reverse link arms respectively and held in direct engagement with said forward and reverse power gears respectively and movable by their associated link arms between engaging and disengaging positions with respect to said forward and reverse rotation gears respectively; and means for urging said link arms to rotate in the direction of rotation of their associated power gears so that rotation of a chosen either one of said power gears in a given direction will cause said forward and reverse rotating gears to be driven in forward and reverse directions respectively, and so that rotation of said chosen power gear in the opposite direction will cause disengagement of said forward and reverse rotating gears from their associated idler gears.

9. A gear driving mechanism for a tape recorder having a motor rotatable in forward and reverse directions, said mechanism comprising:

a power idler gear coupled to said motor to be bidirectionally driven according to the direction of rotation of said motor;

a pivoting gear;

movable mounting means for mounting said pivoting gear to satellite around said power idler gear between first and second dirve positions according to the direction of rotation of said power idler gear while remaining in driven engagement therewith;

gear means having a plurality of gears including forward and reverse rotation gears for driving forward and reverse reel bases respectively and a forward power gear and a reverse power gear directly engaged to each other, a forward idler gear pivotally mounted to satellite about said forward power gear to engagingly supply drive from said forward power gear to said forward rotation gear when said forward power gear is driven in a given direction, a reverse idler gear pivotally mounted to satellite about said reverse power gear to engagingly supply drive from said reverse power gear to said reverse rotation gear when said reverse power gear is driven in a direction opposite to that of said forward power gear, and wherein said gear means is configured so that said pivoting gear drivingly engages one of said forward or reverse power gears when in said first drive position thereof and is disengaged from said one of said forward or reverse power gears when in said second drive position;

means for regulating the position of said pivoting gear between said first and second drive positions thereof; and a head plate movable between advanced and retreated positions and having a pair of guide holes for engagingly displacing journals of said forward and reverse idler gears according to the position of said head plate, said guide holes being configured to urge said forward and reverse idler gears to disengage from said forward and reverse rotation gears respectively when said head plate is at said retreated position.

* * * * *